(12) United States Patent
Safai

(10) Patent No.: US 11,169,021 B2
(45) Date of Patent: Nov. 9, 2021

(54) METHOD AND DEVICE COMPRISING UV DETECTORS FOR MONITORING UV LIGHT EXPOSURE OF A FLAT-PLY OF PREPREG

(71) Applicant: The Boeing Company, Chicago, IL (US)

(72) Inventor: Morteza Safai, Newcastle, WA (US)

(73) Assignee: The Boeing Company, Chicago, IL (US)

(*) Notice: Subject to any disclaimer, the term of this patent is extended or adjusted under 35 U.S.C. 154(b) by 142 days.

(21) Appl. No.: 16/526,262

(22) Filed: Jul. 30, 2019

(65) Prior Publication Data
US 2021/0033455 A1    Feb. 4, 2021

(51) Int. Cl.
*G01J 1/42* (2006.01)
*H04Q 9/00* (2006.01)
*G01J 1/44* (2006.01)

(52) U.S. Cl.
CPC .............. *G01J 1/429* (2013.01); *H04Q 9/00* (2013.01); *G01J 2001/4413* (2013.01); *H04Q 2209/40* (2013.01); *H04Q 2209/886* (2013.01)

(58) Field of Classification Search
CPC ....................................................... G01J 1/429
USPC ........................................................ 250/372
See application file for complete search history.

(56) References Cited

U.S. PATENT DOCUMENTS

| | | | | |
|---|---|---|---|---|
| 7,057,183 B2* | 6/2006 | May | ...................... | G01J 1/4228 |
| | | | | 250/372 |
| 7,976,777 B2* | 7/2011 | Gutman | .................... | A61L 2/10 |
| | | | | 422/24 |
| 8,558,329 B2* | 10/2013 | Wang | ..................... | B82Y 40/00 |
| | | | | 257/415 |
| 9,082,025 B2* | 7/2015 | Fastert | ................... | G01K 1/022 |
| 9,550,005 B2* | 1/2017 | Lin | ........................... | A61L 2/10 |
| 9,572,903 B2* | 2/2017 | Dobrinsky | ............... | A61L 2/24 |
| 9,766,121 B2* | 9/2017 | Sandhu | ................ | G01J 1/0219 |
| 10,485,118 B2* | 11/2019 | Elolampi | ............... | H05K 3/284 |
| 2016/0368170 A1 | 12/2016 | Safai | | |

OTHER PUBLICATIONS

Liu et al., "ZnO-Based Ultraviolet Photodetectors," Sensors 2010, vol. 10, Issue 9, Sep. 17, 2010, pp. 8604-8634.
Jin et al., "High-performance flexible ultraviolet photoconductors based on solution-processed ultrathin ZnO/Au nanoparticle composite films," Scientific Reports, vol. 4, Mar. 4, 2014, 8 pages.
Liu et al., "Influence of thin metal nanolayers on the photodetective properties of ZnO thin films," Journal of Applied Physics, vol. 106, copyright 2009, American Institute of Physics, 4 pages.
Wang, "Introduction of Piezotronics and Piezo-Phototronics," Piezotronics and Piezo-Phototronics, Microtechnology and MEMS, copyright 2012, Springer-Verlag Berlin Heidelberg, 18 pages.

* cited by examiner

*Primary Examiner* — Allen C. Ho
(74) *Attorney, Agent, or Firm* — Yee & Associates, P.C.

(57) ABSTRACT

A UV detection device is removably attached to a surface of a structure and includes a photodetector to detect UV light incident on the structure. The UV detection device includes signal processing and a transmitter that wirelessly transmits UV detection data to a remote monitoring station where the detection signals are accumulated and analyzed to determine the total exposure of the structure to UV light.

20 Claims, 9 Drawing Sheets

METHOD AND DEVICE COMPRISING UV DETECTORS FOR MONITORING UV LIGHT EXPOSURE OF A FLAT-PLY OF PREPREG

BACKGROUND INFORMATION

1. Field

The present disclosure generally relates to structures formed of materials that are subject to change when exposed to UV light and deals more particularly with a device and method for detecting and monitoring the amount of UV exposure of such structures.

2. Background

Structures formed of certain materials may undergo undesired changes when subjected to UV (ultraviolet) light over a period of time. For example, composite prepregs in which the matrix is only partially cured begin to undergo curing (polymerization) when exposed to room temperatures. Consequently, the prepreg is often placed in cold storage until ready for use. However, prepreg may begin to undergo at least partial curing when exposed to UV light. UV light affecting prepreg may originate from various sources, particularly in high-production environments, such as the sun, fluorescent lights, mercury lamps, hydrogen lamps, and xenon arc lamps, to name only a few.

Partial curing of the prepreg due to UV exposure may adversely affect the performance of structures made from these materials. Because of the effects of UV exposure, some prepreg materials are given a projected useful lifetime based on an estimated amount of exposure to known or suspected source of UV radiation. However, these estimates may be less or greater than the actual UV exposure. As result, prepregs used in production of composite structures may have less than optimal characteristics, or alternatively, prepreg materials may be prematurely discarded as a result of an overestimate of UV exposure. In some cases, fully cured composite structures as well as structures made from other materials may also undergo undesired changes when overexposed to UV light.

Accordingly, it would be desirable to more accurately assess the cumulative exposure of a material, such as a prepreg, to UV light in order to more accurately determine its suitability for a particular application.

SUMMARY

The disclosure relates in general to structures formed of materials that are subject to undesired changes when exposed to UV light and more specifically to a system and method for detecting the amount of UV exposure of a structure such as a prepreg.

According to one aspect, a device is provided for determining exposure of a structure to UV light. The device includes a photodetector located on a surface of the structure for detecting UV light incident on the photodetector and configured to produce signals representing the UV light. The device also includes a wireless transmitter coupled to the photodetector for wirelessly transmitting signals representing the UV light.

According to another aspect, a system is provided for determining the amount of exposure of a composite structure to UV light. At least one UV detector is configured to be attached to the composite structure. The UV detector includes a photodetector configured to detect UV light incident on the composite structure and generate electrical signals representing the UV light. A wireless transmitter coupled to the photodetector is configured to wirelessly transmit the electrical signals representing the UV light. A receiver is configured to receive the electrical signals transmitted by the wireless transmitter, and a program computer is provided which is coupled to the receiver and is configured to calculate the amount of UV light incident on the composite structure over a period of time.

According to a further aspect, a method is provided for determining exposure of a composite structure to UV light. The method includes placing a UV detector on a surface of the composite structure and detecting UV light incident on the surface of the composite structure using the UV detector. The method also includes transmitting wireless signals from the UV detector representing the UV light detected by the UV detector and receiving wireless signals at a monitoring station. The method further includes determining the total exposure of the composite structure to UV light based on the wireless signals received at the monitoring station.

One of the advantages of the disclosed embodiments is that the total exposure of a structure to UV light can be determined inexpensively and avoids the need for complex and/or cumbersome equipment. The disclosed UV light detector and monitoring system solves the problem of determining whether a material such as a prepreg has been overexposed or underexposed to UV light. Another advantage of the disclosed embodiments is that specific areas of a structure can be monitored for UV light exposure. A further advantage is that UV light exposure of a structure can be remotely monitored. Still another advantage of the disclosed embodiments is that UV light exposure can be accumulated over time and compared to a threshold level. Still another advantage is that an alert can be automatically generated when the accumulated UV light exposure of a structure has exceeded a preselected level.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Figure 1:
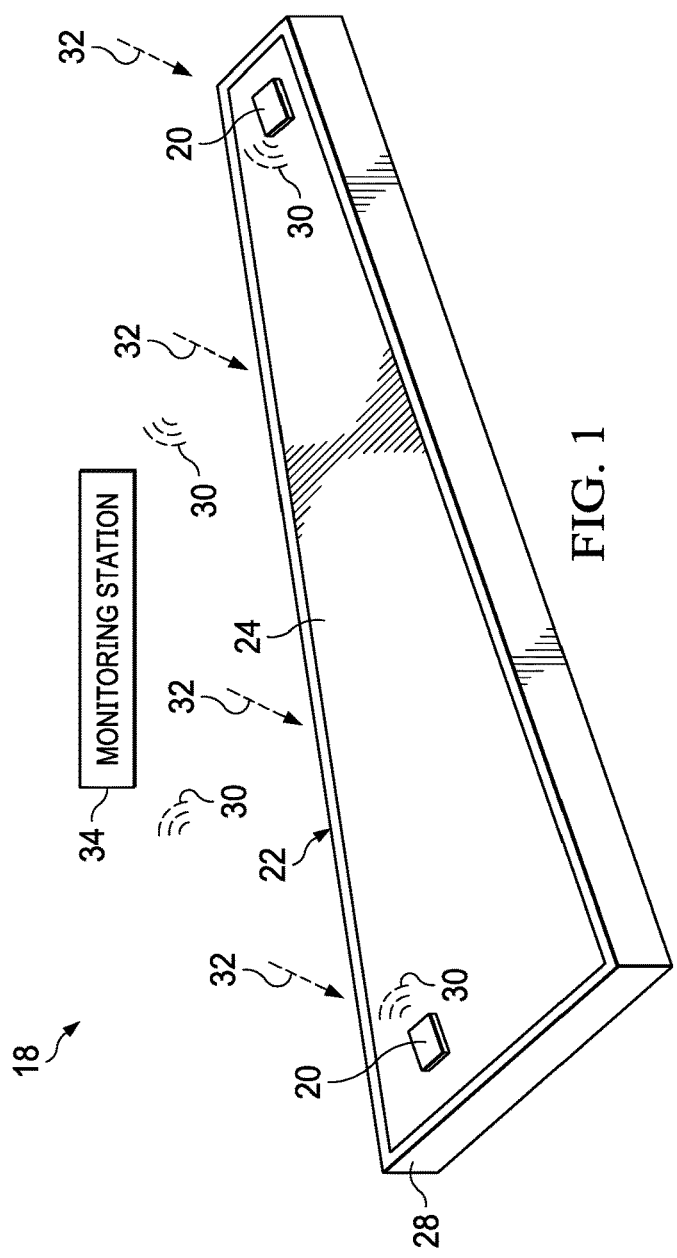
FIG. 1 is an illustration of a composite structure having UV detectors attached thereto, shown sending detection signals to a monitoring station

FIG. 1 illustrates a system 18 for detecting and accumulating the amount of UV light 32 incident on the surface 24 of a structure 22. The structure 22 may be a cured or uncured polymer, or other material whose characteristics or properties may be undesirably altered due to exposure to UV light 32 over a period of time. In the illustrated example, the structure 22 comprises a flat ply of prepreg supported on an underlying tool 28. However, the structure 22 may have any shape and may include contoured and/or irregular surfaces.

The system 18 includes one or more UV light detectors (hereinafter "UV detector") 20 which are attached to the surface 24 of the structure 22 by any suitable technique. For example, the UV detector 20 may be removably attached to a structure 22 using an adhesive or similar attachment means, as will be discussed later in more detail. The UV detector 20 is flexible, thereby allowing it to conform to surface contours or irregularities on the structure 22. Each of the UV detectors 20 functions to sense UV light 32 incident on it, and thus incident on the surface 24 of the structure 22 where the UV detector 20 is located. The UV detector 20 may be a piezo-phototronic semiconductor device that produces an electrical signal (a photocurrent) corresponding to the magnitude of the UV light which it detects. As used herein, "UV light" broadly refers to a band of the electromagnetic spectrum with wavelengths between approximately 10 nm and 400 nm. However, in an application of the system 18 where a prepreg is being monitored for UV light exposure, UV light 32 having wavelengths in the range of approximately 300 nm to 350 nm is of particular interest because of the vulnerability of prepreg, and particularly carbon fiber epoxy, to UV light 32 within this range.

The electrical signals produced by UV detector 20 are processed onboard the UV detector 20 and transmitted as wireless signals 30 to a monitoring station 34 where the wireless signals 30 are accumulated and analyzed to determine whether the structure 22 has been exposed to UV light 32 over a period of time that exceeds a threshold value. In the case of a structure 22, for example, use of the system 18 allows determining whether the prepreg may have cured beyond a certain point due to UV light exposure, such that it may not be suitable for a particular application.

Figure 2:
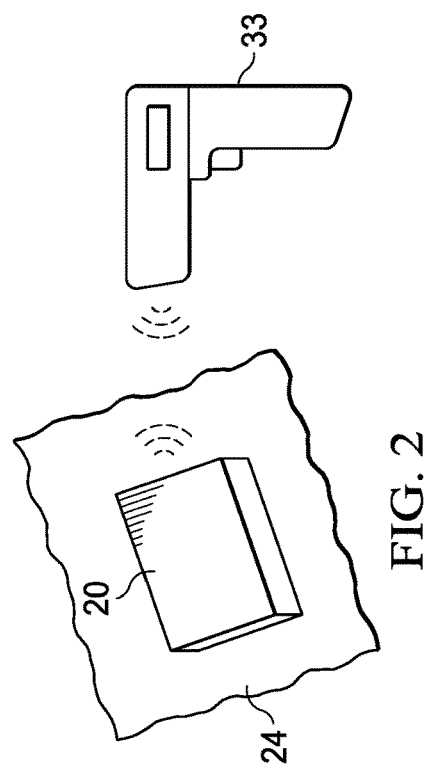
FIG. 2 is an illustration of a diagrammatic perspective view of a monitoring system using a portable UV data reader.

Although a remote monitoring station 34 is employed in the example shown in FIG. 1, other monitoring techniques and systems are possible. For example, FIG. 2 illustrates the use of portable data reader 33 that may be brought into proximity with a UV detector 20 in order to read and/or view the UV exposure data that has been stored in a memory (not shown) on the UV detector 20. In some examples, the UV detector 20 may be an active device having an onboard power supply allowing the UV detector 20 transmit detection signals short distances capable of being received by the portable data reader 33, while in other examples the UV detector 20 may be a passive system in which the UV detector's transmitting power is supplied by the portable data reader 33, similar to a passive RFID (radio frequency identification) tag.

Figure 3:
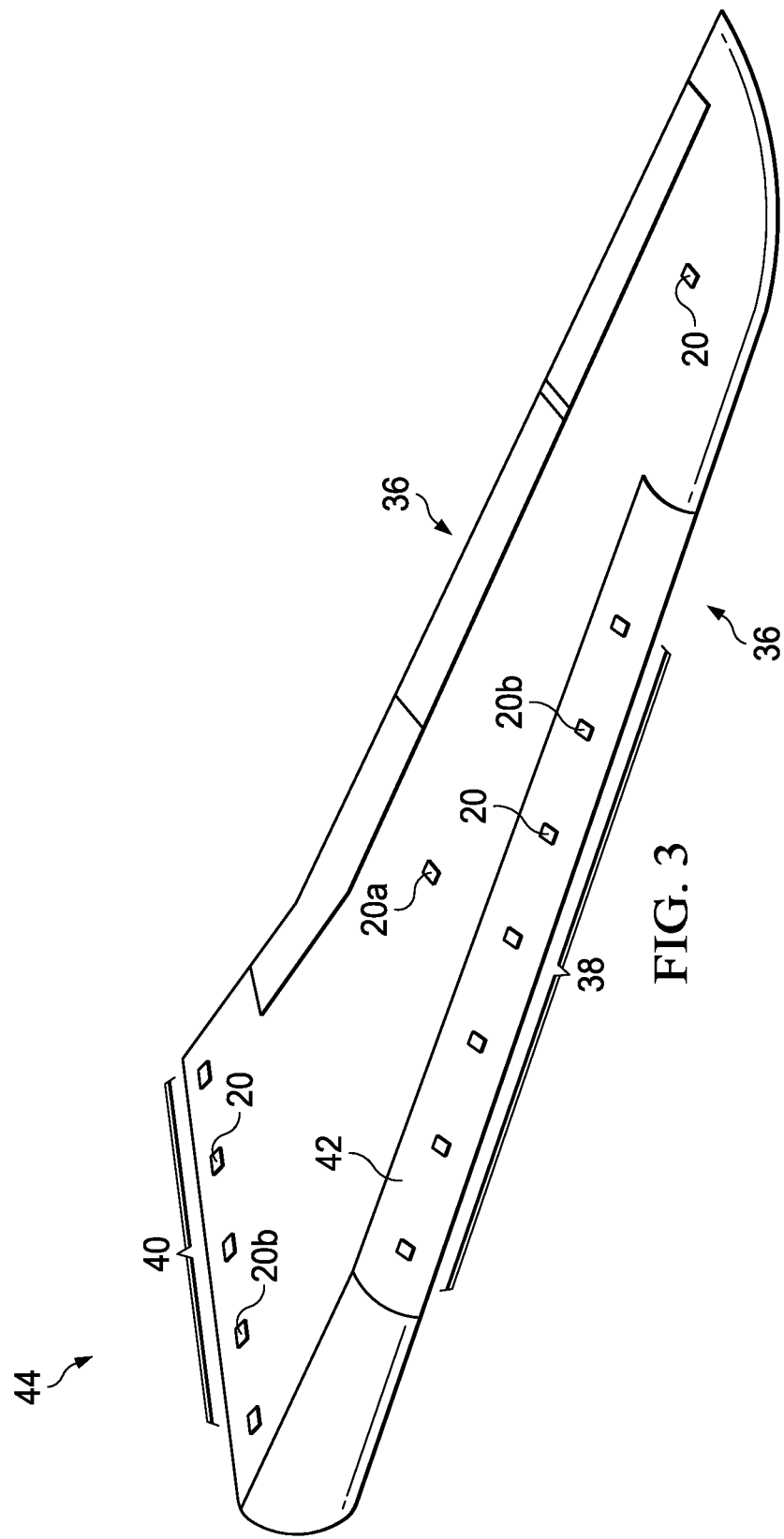
FIG. 3 is an illustration of a perspective view of an airplane wing having a composite skin with UV detectors attached thereto.

The number and placement of the UV detectors 20 may vary with the application. In some cases, a single UV detector 20 placed on a particular location of the structure 22 may be adequate, while in other cases, multiple UV detectors 20 may be necessary or desirable. The UV detectors 20 may be arranged either randomly or in preselected areas on the surface 24 of the structure 22. For example, referring to FIG. 3, one or more of the UV detectors 20 may be removably attached to the composite skin of an airplane wing 36. Individual ones of the UV detectors 20a may be placed along the length of the airplane wing 36, while other UV detectors 20b may be arranged in arrays 38, 40 respectively along a leading edge 42 and root 44 of the airplane wing 36.

Figure 4:
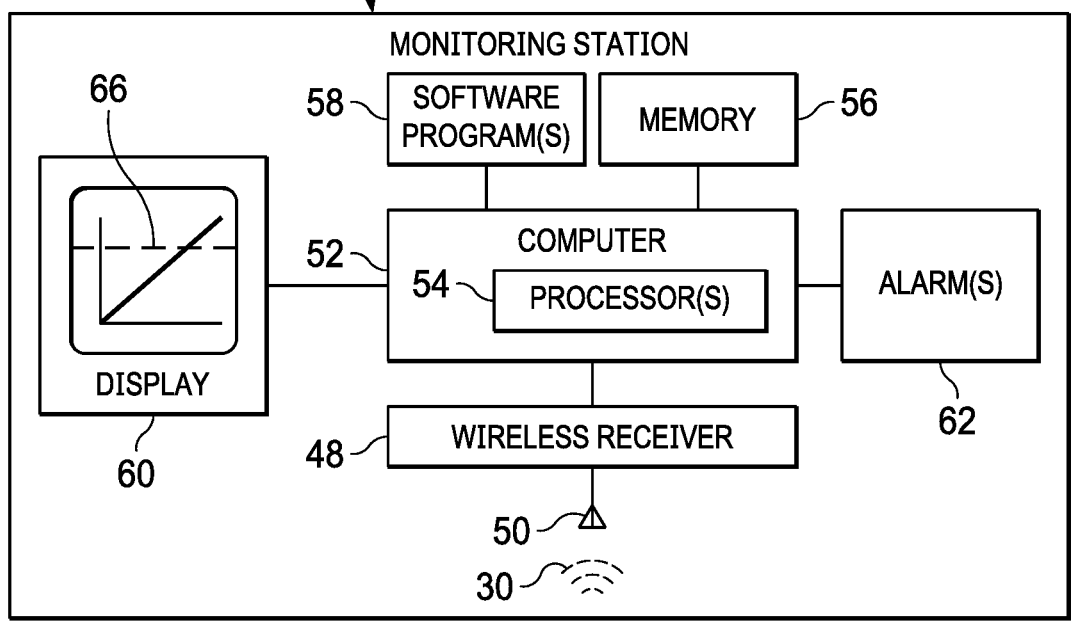
FIG. 4 is an illustration of a diagram of one example of the monitoring station shown in FIG. 1.

FIG. 4 broadly illustrates the components of one embodiment of the monitoring station 34. The wireless signals 30 transmitted by the UV detectors 20 are picked up by an antenna 50 forming part of a wireless receiver 48. The received wireless signals 30 are delivered to a computer 52 having one or more processors 54. The computer 52 may be coupled with one or more memories 56 for storing data such accumulated UV data representing the amount of UV light 32 that has been detected by one or more UV detectors 20 over one or more periods of time. The computer 52 may be controlled by one or more software programs 58 that are suitable for the particular application. The monitoring station 34 may also include one or more visual or audible alarms 62 and one or more displays 60 that display data, either in graphic or numerical form, representing an accumulation of the detected UV light 32. When the accumulated UV exposure 64 exceeds preselected threshold level 66 (FIGS. 4 and 5), the computer 52 may activate the alarm 62 in order to alert operating personnel that the threshold UV exposure level has been reached or exceeded. Alternatively, personnel may observe the preselected threshold level 66 being met or exceeded on the display 60.

Figure 5:
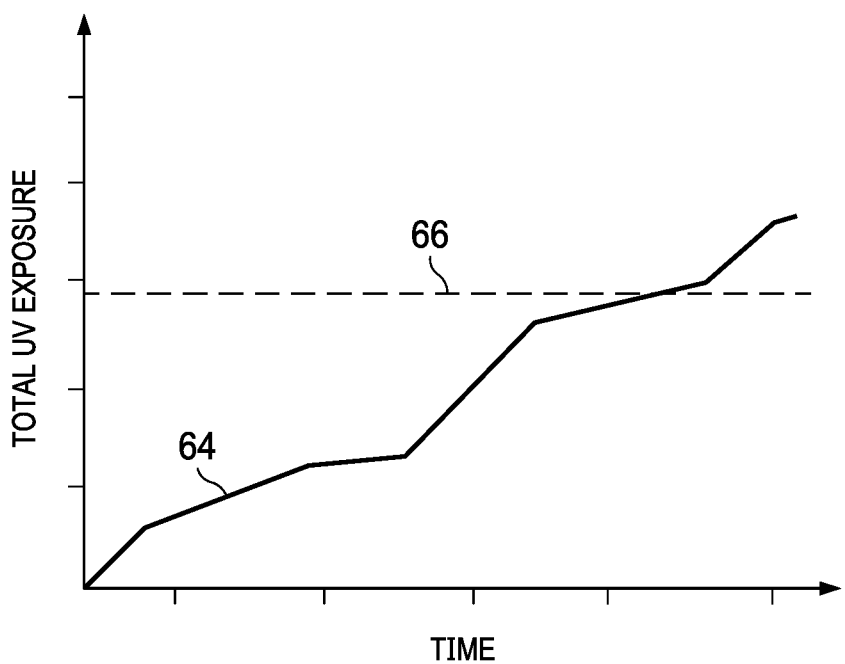
FIG. 5 is an illustration of a graph showing accumulated UV exposure over time.
Figure 6:
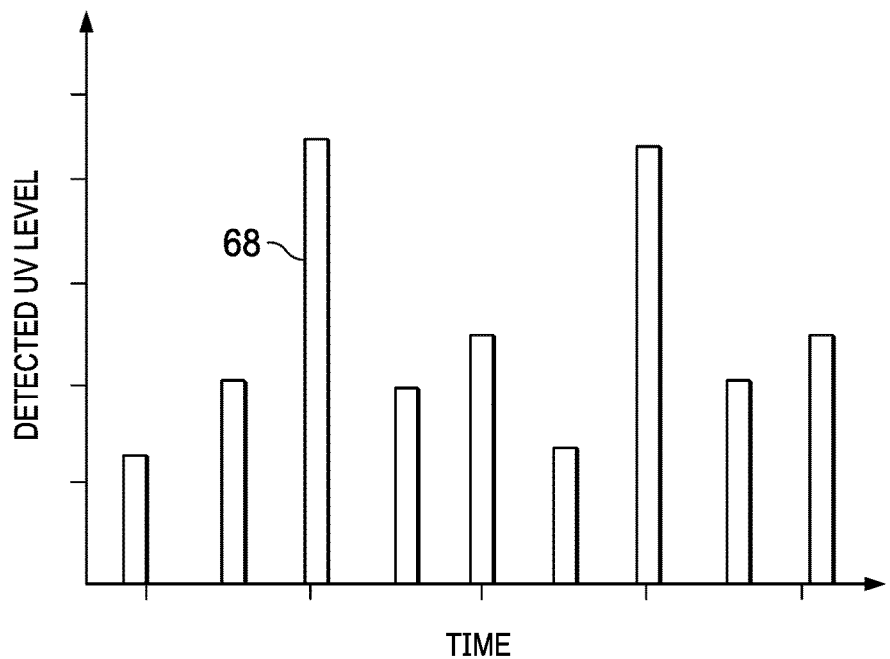
FIG. 6 is an illustration of a graph showing UV exposure detected during individual segments of time.

FIG. 5 is a graph illustrating one example of how the accumulated UV exposure 64 can be displayed on the display 60 shown in FIG. 4. In this example, the total or accumulated UV exposure 64 is shown as a function of the elapsed time. The preselected threshold level 66 is also shown, in relationship to the accumulated UV exposure 64. Alternatively, as illustrated in FIG. 6, the detected UV level detected over individual time intervals 68 may be displayed. By calculating and displaying the accumulated UV exposure 64 over individual time intervals 68, trends in the UV exposure may be revealed that are useful in controlling/altering environmental factors affecting UV exposure, such as man-made lighting.

Figure 7:
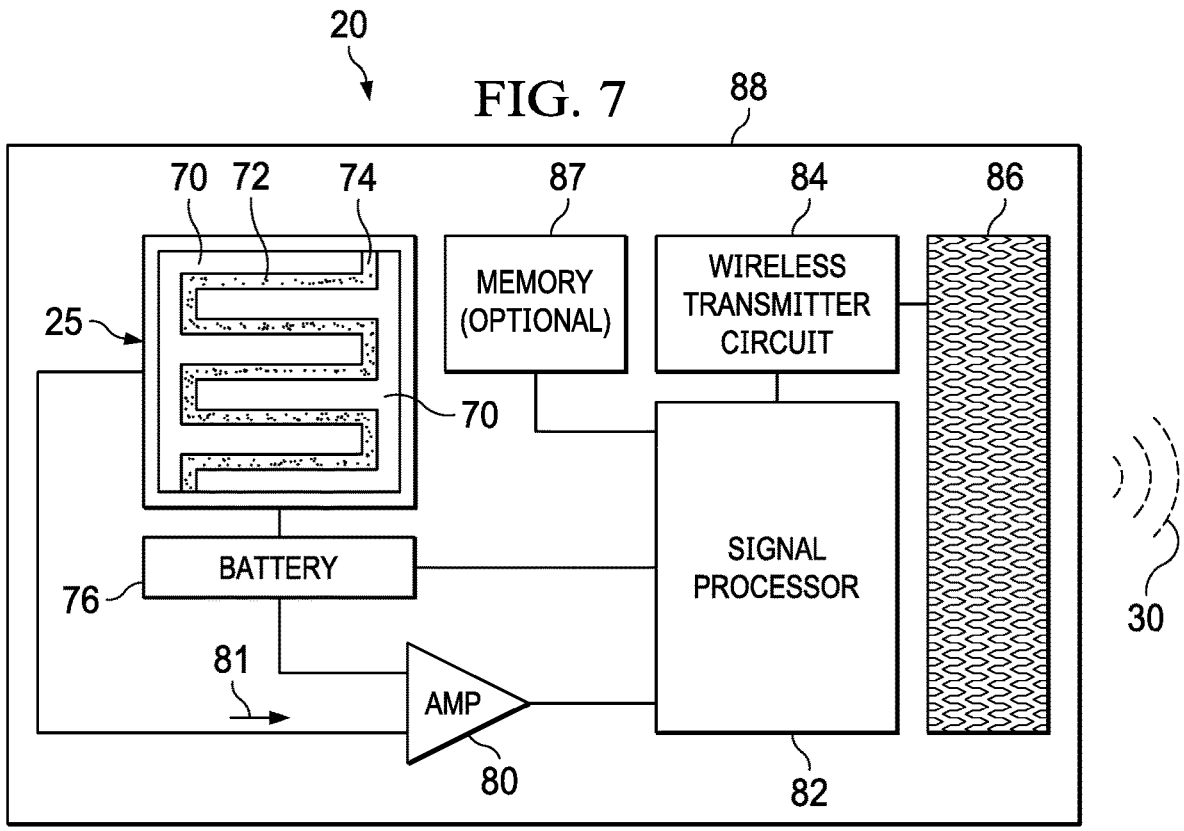
FIG. 7 is an illustration of a combined block and diagrammatic view of one example of the UV detector.

Attention is now directed to FIG. 7 which illustrates additional details of the UV detector 20. The UV detector 20 broadly comprises a photodetector 25 along with several other components mounted on a relatively thin, flexible substrate 88. The flexible substrate 88 may comprise for example and without limitation, a flexible polymer film such as PET (polyethylene terephthalate), or another flexible material suitable for the application. Also mounted on the flexible substrate 88 is a power supply source such as a battery 76, an amplifier 80, a signal processor 82, a wireless transmitter circuit 84 and a transmit antenna 86. Optionally, the UV detector 20 may also include a memory 87 mounted on the flexible substrate 88 for storing information such as UV light detection data accumulated over a period of time.

The amplifier 80 is powered by the battery 76 and functions to amplify the UV detection signals 81, sometimes referred to as a photocurrent, generated by the photodetector 25 before being delivered to the signal processor 82. The battery 76 also powers the signal processor 82 and wireless transmitter circuit 84. Although a battery 76 is employed in the illustrated embodiment, other power sources, such as a storage capacitor (not shown) are possible. The signal processor 82 converts the amplified UV detection signals 81 into a format suitable for wireless transmission. The wireless transmitter circuit 84 drives the transmit antenna 86 which wirelessly transmits the wireless signals 30. The wireless signals 30 are received by the previously discussed wireless receiver 48 (FIG. 4) forming part of the monitoring station 34.

Figure 8:
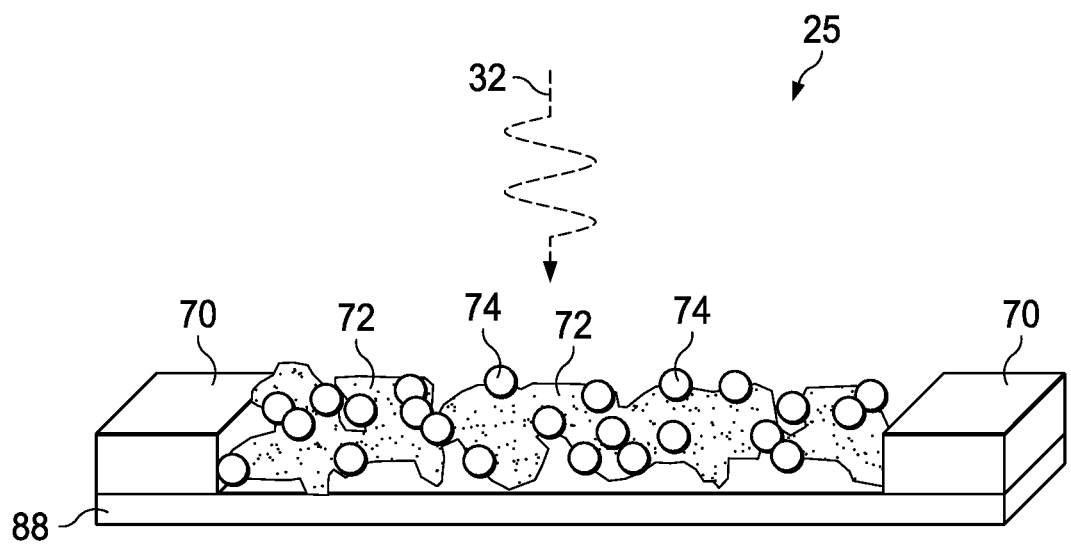
FIG. 8 is an illustration of a simplified perspective view of a semiconductor device useful in explaining the operation of a ZnO—Au photodetector.

Referring now to both FIGS. 7 and 8, the photodetector 25 generates the UV detection signals 81 representing detected UV light 32 using a mechanism referred to as a piezo-phototronic effect. The piezo-phototronic effect is a three-way coupling of piezoelectric, semiconductor, and photonic properties in non-central symmetric semiconductor materials. In the example shown in FIG. 7, the photodetector 25 comprises a thin film of ZnO (zinc oxide) crystals 72 formed on the surface of the flexible substrate 88, and a pair of interlaced, spaced-apart metal electrodes 70 which function as ohmic contacts. ZnO has a room-temperature bandgap of 3.37 eV, strong radiation hardness, high chemical stability, and is relatively inexpensive. A thin film, for example approximately 5 nm, of ZnO can be applied to the flexible substrate using any of known processing techniques, such as, without limitation, chemical vapor deposition (CVD).

As shown in FIG. 7, the pair of interlaced spaced-apart metal electrodes 70 overlie the ZnO crystal 72 and are respectively connected to the battery 76 and to the amplifier 80. In the illustrated example, the pair of interlaced spaced-apart metal electrodes 70 comprise Pt (platinum) however other conductive materials may be used, depending on the application, such as Au, Al, Al/Au, Ni/Au or ITO (indium tin oxide) to name only a few. The thin-film of ZnO crystal 72 and the pair of interlaced spaced-apart metal electrodes 70 effectively form a metal-semiconductor-metal photonic generator photodetector device that generates a photocurrent when bombarded with UV light 32 of wavelengths to which the photodetector 25 has been effectively tuned.

To enhance the responsiveness of the photodetector 25, the bandgap of the ZnO can be adjusted by doping the film of ZnO 72 using certain elements. For example, in the illustrated embodiment, doping can be achieved by sparsely distributing Au (gold) particles 74 over the surface of the film of ZnO 72. Doping using Au particles increases the photocurrent produced by the photodetector 25, and assists in reducing the dark current, thereby enhancing the sensitivity and response speed of the ZnO-based photodetector 25. In connection with monitoring prepreg for UV light exposure, the use of a ZnO—Au based photodetector 25 has been found to be particularly effective in detecting the wavelengths of UV light of interest. However, in other applications, it may be possible to use photodetectors based on other types of materials such as, without limitation, ZnS GnA, InN, CaN, and CdSe, all of which simultaneously possess piezoelectric and semiconductor properties.

Figure 9:
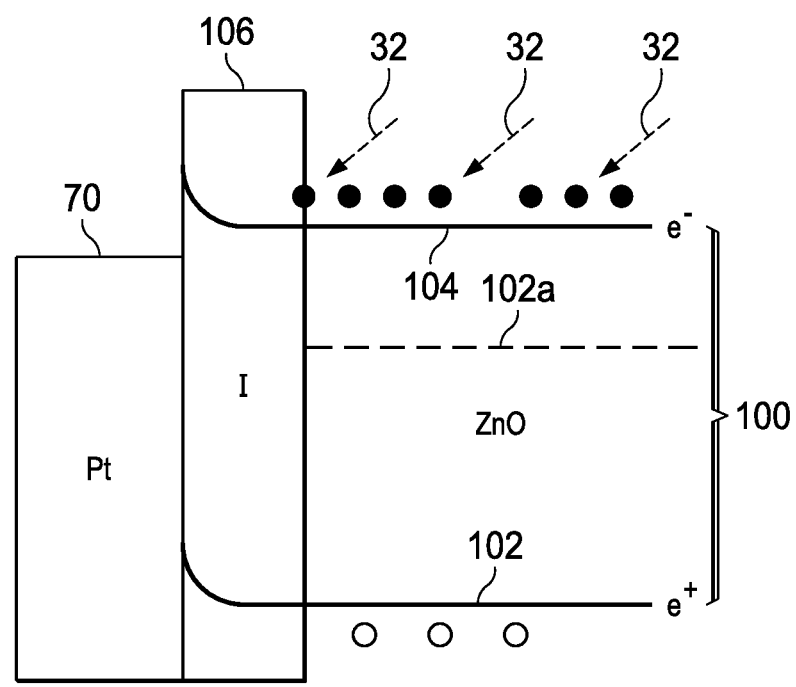
FIG. 9 is an illustration of a band diagram useful in explaining the operation of a UV photodetector.

Attention is now directed to FIG. 8 which illustrates a simplified form of the photodetector 25 and FIG. 9 which shows a related band diagram. As previously described, a semiconductor such as ZnO 72 formed on a flexible substrate 88 is doped with a bandgap altering enhancer such as Au particles 74 which are, in this example, sparsely distributed over the top of the ZnO 72. The opposite sides of the ZnO 72 are contacted by two ohmic electrodes 70, forming a metal-semiconductor-metal junction device capable of producing a photocurrent when the ZnO—Au is bombarded by photons of UV light 32.

The ZnO has a valence band 102 and a conduction band 104 forming a bandgap 100 which, in the case of undoped ZnO is approximately 3.7 eV. Doping of the ZnO with Au effectively raises the valence band to 102a, making it easier for electrons to flow to the conduction band 104 and thereby increase the photocurrent produced by a given level of UV light incident on the ZnO. The UV light 32 incident on the photodetector 25 creates additional charge carriers between the valence band 102a and the conduction bands 104, resulting in a current flow between the two electrodes 70 which is proportional to the magnitude of the incident UV light 32. When a photon with energy larger than the bandgap energy of the ZnO—Au is absorbed, an electron-hole pair is produced, thereby changing the electrical conductivity of the ZnO—Au semiconductor and producing a photocurrent.

Figure 10:
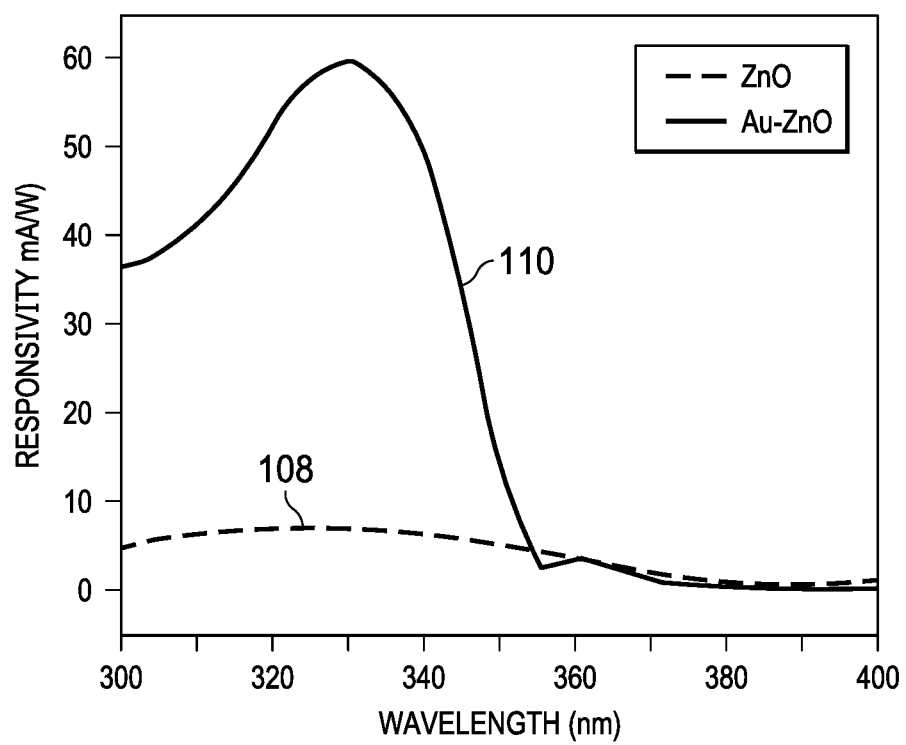
FIG. 10 is an illustration of a graph showing the responsivity of the UV detector as a function of the wavelength of UV light.

Attention is now directed to FIG. 10 which illustrates the higher responsiveness of the photodetector 25 as a result of doping the ZnO with Au. In this view, the responsivity of the photodetector 25 for UV light in the wavelength range between 300 and 400 nm, measured in mA/W, employing only ZnO is shown by the curve 108. The responsivity of a ZnO-based photodetector 25 doped with Au is shown by the curve 110. From the curves shown in FIG. 10, it can be seen that an Au-doped ZnO photodetector 25 has considerably higher responsivity to UV light in the range from approximately 300 nm to 360 nm.

Figure 11:
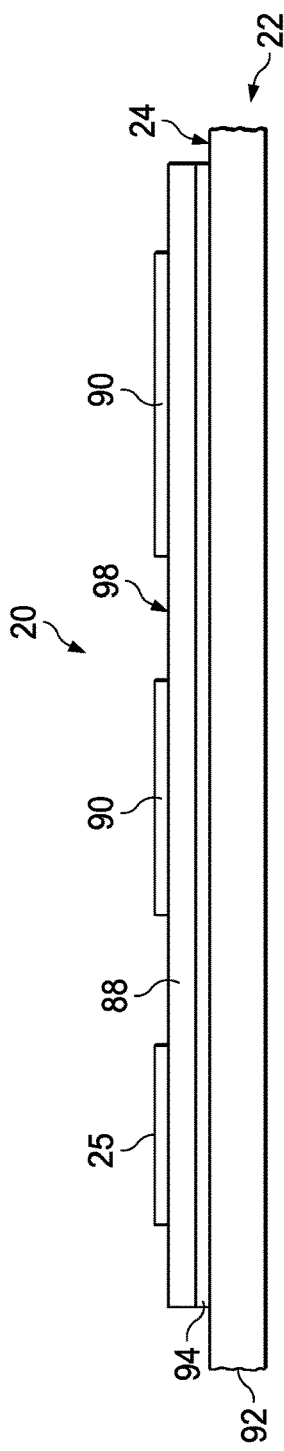
FIG. 11 is an illustration of a fragmentary, side view of the UV detector attached to an underlying structure.
Figure 12:
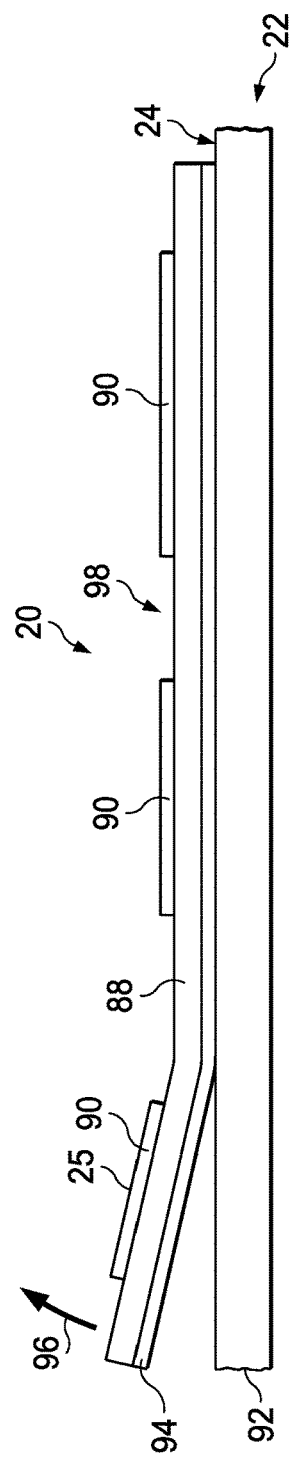
FIG. 12 is an illustration similar to FIG. 11 but showing the UV device being peeled away from the surface of the structure after use.

FIGS. 11 and 12 illustrate a UV detector 20 that has been applied to the surface 24 of a structure 22, which in this example is a composite skin 92. As previously explained, the photodetector 25 is formed directly on the surface 98 of the flexible substrate 88. The remaining components of the UV detector 20 (shown in FIG. 11) may be in the form of integrated circuit chips 90 attached to the surface 98 of the flexible substrate 88. Alternatively, in some embodiments, these additional components may comprise circuits that are formed directly on the flexible substrate 88.

The flexible substrate 88 may be attached to the surface 24 of the composite skin 92 by a layer of adhesive 94, however other means of attaching the UV detector 20 to the structure 22 are possible. The adhesive 94 may be any suitable adhesive that will adhere the UV detector 20 to the surface 24 of the structure 22, while allowing it to be removed when desired, by peeling 96 (FIG. 12) it away from the surface 24 of the structure 22. The adhesive 94 may be applied to the surface 24 and/or to the substrate 88 by any of various techniques, such as by painting or spraying. Alternatively, the adhesive 94 may be an adhesive in the form of a film.

Figure 13:
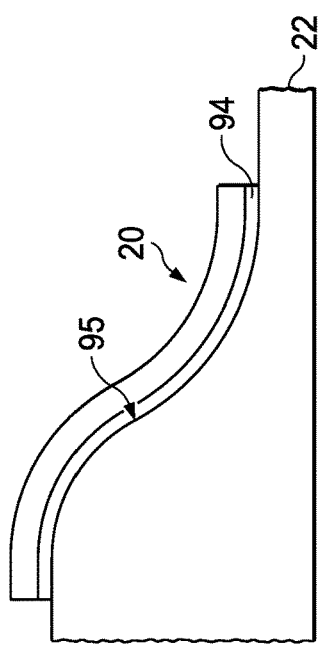
FIG. 13 is an illustration of a fragmentary, cross-sectional view of a structure having a contoured surface on which a conforming UV detector is attached.

FIG. 13 illustrates a UV detector 20 that has been applied to a contoured surface 95 of a structure 22. Due to its flexibility, it can be seen that the UV detector 20 conforms to the contoured surface 95 throughout the area of the UV detector 20. Because the UV detector 20 matches the contours of the surface 95, it may more accurately detect UV light reaching the structure 22 at differing angles of incidence because of surface contours on the structure 22.

Figure 14:
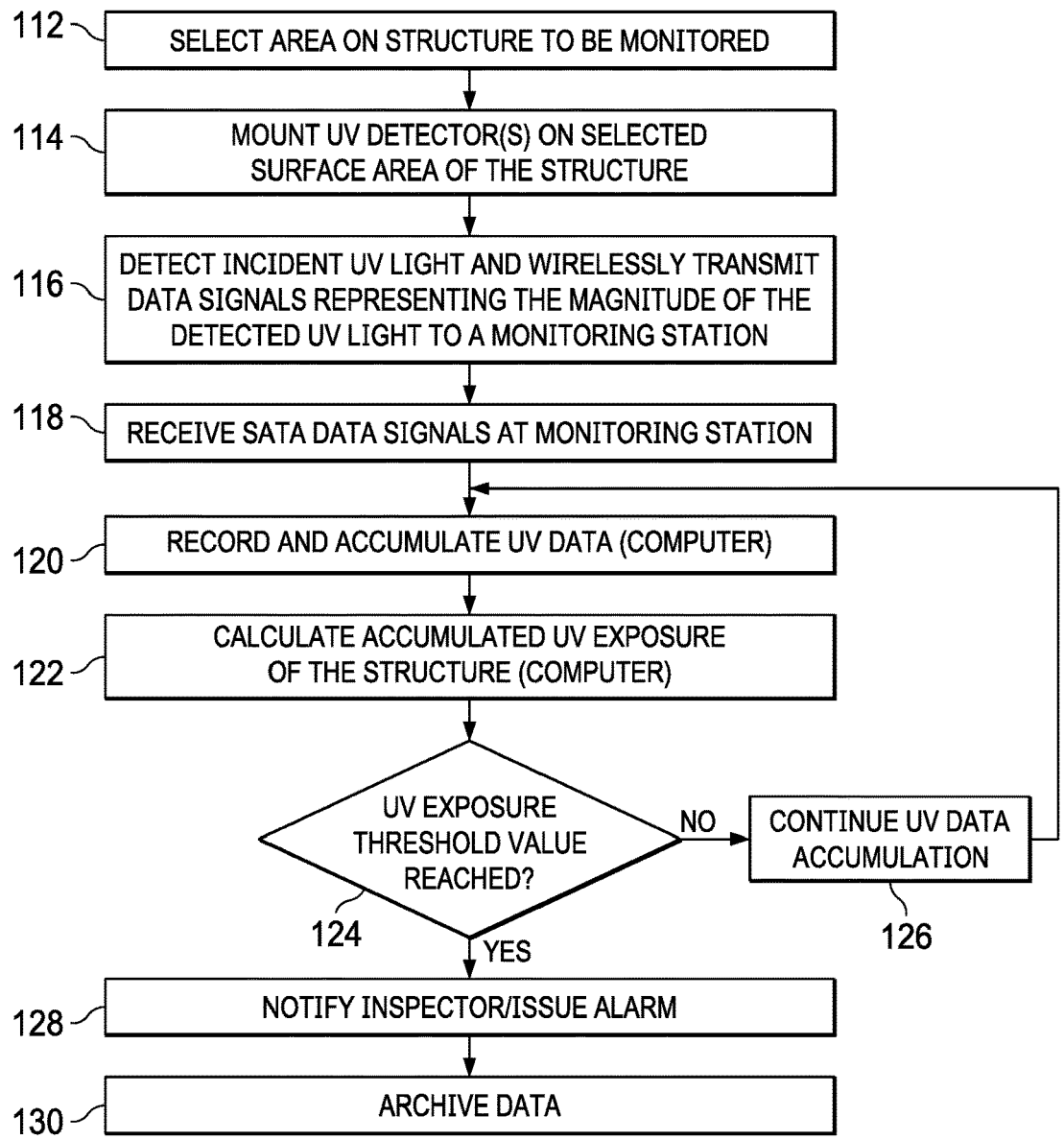
FIG. 14 is an illustration of a flow diagram of a method of detecting and monitoring UV light incident on a structure.

Attention is now directed to FIG. 14 which broadly illustrates the steps of a method of monitoring the exposure of a structure 22 to UV light 32. At 112, an area on the structure 22 is selected which is to be monitored for UV light exposure. At 114, one or more UV detectors 20 are mounted on the structure 22 in the area that has been selected for monitoring. At 116 the UV detectors 20 detect incident UV light 32 and wirelessly transmit data signals 30 representing the magnitude of the detected UV light 32 to a monitoring station 34. At 118 the wireless data signals 30 are received at the monitoring station 34. At 120, a programmed computer 52 or similar processor records and accumulates the UV data. At 122 the computer 52 calculates the accumulated UV exposure 64 of the structure 22 based on the accumulated UV data. At 124, a determination is made of whether the accumulated UV exposure 64 has exceeded a preselected threshold level 66. If the threshold level 66 has not been reached or exceeded, then the UV exposure data continues to be accumulated at step 126, and subsequently compared against the threshold level 66 at 124. However, if the accumulated UV exposure 64 has reached or exceeded the threshold level 66 at 124, then at 128, an inspector or similar operating personnel is alerted and/or an alarm is issued. In some examples, at 130, the UV exposure data may be archived for future reference or analysis.

Figure 14A:
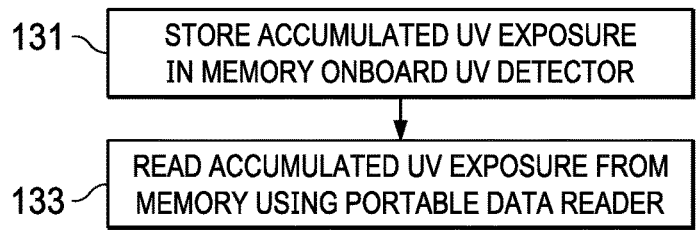
FIG. 14A is an illustration of a partial flow diagram of alternate steps forming part of the method shown in FIG. 14.

As previously indicated, in some embodiments, the accumulated UV exposure 64 may be stored onboard the UV detector 20 rather than being transmitted to a monitoring station 34. Thus, referring to FIG. 14A, at 131, the accumulated UV exposure 64 is stored in a memory 87 on board the UV detector 20, and at 133, the accumulated UV exposure 64 may be read from the memory 87 using a portable data reader 33 or similar device.

Figure 15:
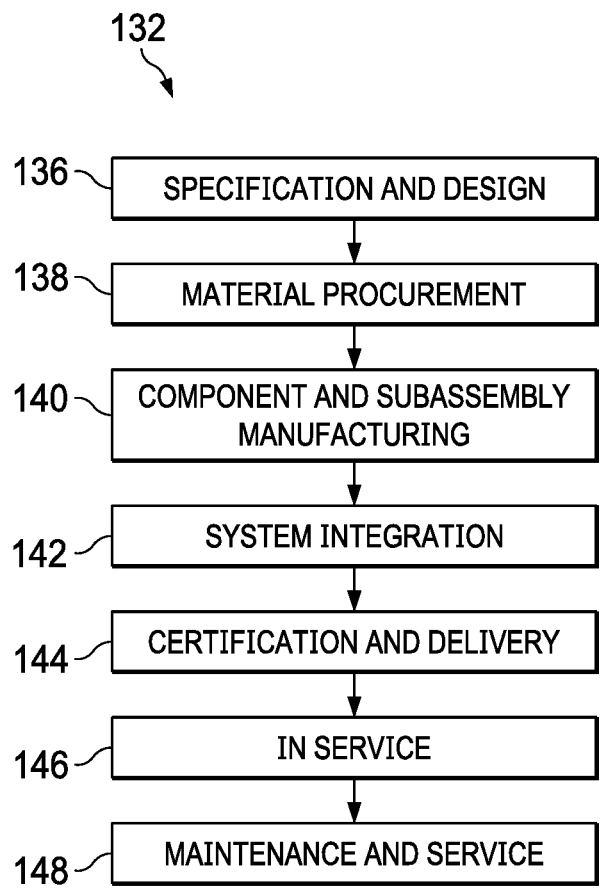
FIG. 15 is an illustration of a flow diagram of aircraft production and service methodology.
Figure 16:
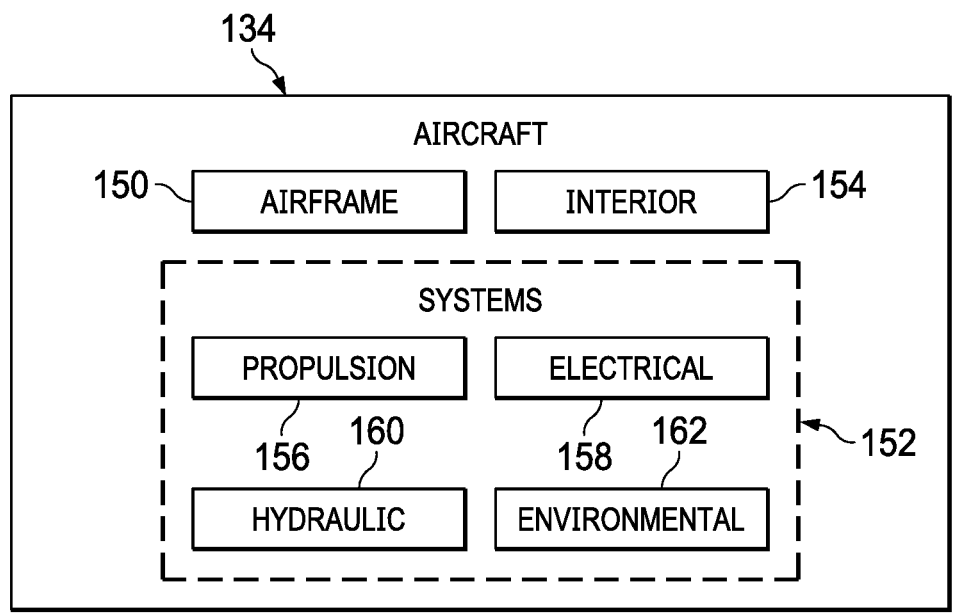
FIG. 16 is an illustration of a block diagram of an aircraft.

Embodiments of the disclosure may find use in a variety of potential applications, particularly in the transportation industry, including for example, aerospace, marine, automotive applications, and other application where structures may be used that may undergo alteration as result of exposure to UV light. Thus, referring now to FIGS. 15 and 16, embodiments of the disclosure may be used in the context of an aircraft manufacturing and service method 132 as shown in FIG. 15 and an aircraft 134 as shown in FIG. 16. Aircraft applications of the disclosed embodiments may include, for example, without limitation, composite components such as fuselage and wing skins that are exposed to UV light. During pre-production, exemplary method 132 may include specification and design 136 of the aircraft 134 and material procurement 138. During production, component and subassembly manufacturing 140 and system integration 142 of the aircraft 134 takes place. Thereafter, the aircraft 134 may go through certification and delivery 144 in order to be placed in service 146. While in service by a customer, the aircraft 134 is scheduled for routine maintenance and service 148, which may also include modification, reconfiguration, refurbishment, and so on. Portions of the aircraft 134 may be assembled as part of one or more of component and subsystem manufacturing 140, system integration 142, as well as in the production of the components of the aircraft 134.

Each of the processes of method 132 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 16, the aircraft 134 produced by exemplary method 132 may include an airframe 150 with a plurality of systems 152 and an interior 154. Examples of high-level systems 152 include one or more of a propulsion system 156, an electrical system 158, a hydraulic system 160, and an environmental system 162. Any number of other systems may be included. Although an aerospace example is shown, the principles of the disclosure may be applied to other industries, such as the marine and automotive industries.

Systems and methods embodied herein may be employed during any one or more of the stages of the production and service method 132. For example, components or subassemblies corresponding to production process 140 may be fabricated or manufactured in a manner similar to components or subassemblies produced while the aircraft 134 is in service. Also, one or more apparatus embodiments, method embodiments, or a combination thereof may be utilized during the production stages 140 and 142, for example, by substantially expediting assembly of or reducing the cost of an aircraft 134. Similarly, one or more of apparatus embodiments, method embodiments, or a combination thereof may be utilized while the aircraft 134 is in service, for example and without limitation, to maintenance and service 148.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A device for determining an exposure of a structure to UV (ultraviolet) light, the device comprising:
   a photodetector disposed on a surface of the structure, wherein the photodetector is configured to detect UV light incident on the photodetector and produce signals representing the UV light;
   a wireless transmitter disposed on the surface of the structure and coupled to the photodetector, wherein the wireless transmitter is configured to wirelessly transmit the signals; and
   a substrate attached to the surface of the structure, wherein the substrate comprises a ply of prepreg.

2. The device of claim 1, wherein the photodetector includes:
   a piezo-phototronic semiconductor configured to produce a photocurrent in a response to an exposure to UV light; and
   ohmic electrodes coupled to the piezo-phototronic semiconductor and configured to form a metal-semiconductor-metal photonic generator.

3. The device of claim 2, wherein the piezo-phototronic semiconductor comprises ZnO semiconductor doped with Au.

4. A device for determining an exposure of a structure to UV (ultraviolet) light, the device comprising:
 a photodetector disposed on a surface of the structure, wherein the photodetector is configured to detect UV light incident on the photodetector and produce signals representing the UV light;
 a wireless transmitter disposed on the surface of the structure and coupled to the photodetector, wherein the wireless transmitter is configured to wirelessly transmit the signals; and
 a substrate attached to the surface of the structure;
 wherein the photodetector and the wireless transmitter are disposed on the substrate.

5. The device of claim 4, wherein the substrate is flexible.

6. The device of claim 4, further comprising:
 a power supply disposed on the substrate;
 an amplifier disposed on the substrate and configured to amplify the signals; and
 a signal processor disposed on the substrate and coupled to the photodetector and the wireless transmitter.

7. The device of claim 4, wherein the substrate is configured to be removable from the surface of the structure.

8. The device of claim 7, further comprising a layer of adhesive configured to removably attach the substrate to the structure.

9. A system for determining an amount of exposure of a composite structure to UV (ultraviolet) light, the system comprising:
 a UV detector configured to be attached to the composite structure, wherein the UV detector includes a photodetector configured to detect UV light incident on the composite structure and generate electrical signals representing the UV light;
 a wireless transmitter coupled to the photodetector and configured to wirelessly transmit the electrical signals;
 a receiver configured to receive the electrical signals;
 a programmed computer coupled to the receiver and configured to calculate an amount of UV light incident on the composite structure over a period of time; and
 a substrate attached to a surface of the composite structure,
 wherein the substrate includes a ply of prepreg.

10. The system of claim 9, wherein:
 the photodetector is disposed on the substrate and includes a ZnO semiconductor responsive to UV light incident on the photodetector to produce the electrical signals representing the UV light; and
 the wireless transmitter is disposed on the substrate.

11. The system of claim 10, further comprising:
 an amplifier disposed on the substrate and configured to amplify the UV detection signals; and
 a battery disposed on the substrate and configured to provide power to the amplifier and to the wireless transmitter.

12. The system of claim 10, further comprising an antenna disposed on the substrate, coupled to the wireless transmitter, and configured to transmit the electrical signals to the receiver.

13. The system of claim 10, further comprising a layer of adhesive configured to removably attach the substrate to the composite structure.

14. The system of claim 10, wherein the substrate comprises a flexible material configured to allow the UV detector to conform to surface contours of the composite structure.

15. The system of claim 14, wherein the ZnO semiconductor is doped with Au.

16. A method of determining an exposure of a composite structure to UV (ultraviolet) light, the method comprising:
 placing a UV detector on a surface of the composite structure;
 detecting UV light incident on the surface of the composite structure using the UV detector;
 transmitting wireless signals from the UV detector representing the UV light detected by the UV detector;
 receiving the wireless signals at a monitoring station; and
 determining a total exposure of the composite structure to the UV light based on the wireless signals received at the monitoring station.

17. The method of claim 16, wherein said detecting UV light incident on the surface of the composite structure using the UV detector comprises using a ZnO photodetector doped with Au to convert the UV light into a photocurrent representing a magnitude of the UV light.

18. The method of claim 16, wherein said placing a UV detector on a surface of the composite structure comprises releasably adhering the UV detector to the surface of the composite structure.

19. The method of claim 16, further comprising removing the UV detector from the surface of the composite structure after a total exposure of the composite structure to the UV light has been determined.

20. The method of claim 16, further comprising calculating an exposure of the composite structure to the UV light over individual time intervals based on the wireless signals received at the monitoring station.

* * * * *